(12) United States Patent
Jambigi et al.

(10) Patent No.: US 11,953,979 B2
(45) Date of Patent: Apr. 9, 2024

(54) USING WORKLOAD DATA TO TRAIN ERROR CLASSIFICATION MODEL

(71) Applicant: SAP SE, Walldorf (DE)

(72) Inventors: Neetha Jambigi, Innsbruck (AT);
Joshua Hammesfahr, Walldorf (DE);
Felix Schabernack, Walldorf (DE);
Leonardo Silva Rosa, Porto Alegre (BR)

(73) Assignee: SAP SE, Walldorf (DE)

( * ) Notice: Subject to any disclaimer, the term of this patent is extended or adjusted under 35 U.S.C. 154(b) by 101 days.

(21) Appl. No.: 17/751,141

(22) Filed: May 23, 2022

(65) Prior Publication Data
US 2023/0244674 A1 Aug. 3, 2023

Related U.S. Application Data

(60) Provisional application No. 63/305,825, filed on Feb. 2, 2022.

(51) Int. Cl.
*G06F 11/00* (2006.01)
*G06F 11/07* (2006.01)
*G06F 16/2455* (2019.01)
*G06F 16/25* (2019.01)

(52) U.S. Cl.
CPC ........ *G06F 11/079* (2013.01); *G06F 16/2455* (2019.01); *G06F 16/252* (2019.01)

(58) Field of Classification Search
CPC .... G06F 11/079; G06F 11/36; G06F 11/3664; G06F 16/2455
See application file for complete search history.

(56) References Cited

U.S. PATENT DOCUMENTS

| | | | |
|---|---|---|---|
| 9,983,918 B2 * | 5/2018 | Gongloor | G06F 11/3466 |
| 2010/0257154 A1 * | 10/2010 | Pendap | G06F 16/24542 707/718 |
| 2012/0221519 A1 * | 8/2012 | Papadomanolakis | G06F 11/3688 707/610 |
| 2019/0065985 A1 * | 2/2019 | Fieres | G06F 11/0703 |
| 2019/0266070 A1 * | 8/2019 | Bhandarkar | G06F 11/3072 |
| 2019/0347188 A1 * | 11/2019 | Sobran | G06N 20/00 |
| 2021/0224275 A1 * | 7/2021 | Maheshwari | G06N 3/044 |
| 2021/0383170 A1 * | 12/2021 | Alshawabkeh | G06F 18/24323 |
| 2022/0019496 A1 * | 1/2022 | Lozano | G06N 20/20 |
| 2023/0244674 A1 * | 8/2023 | Jambigi | G06F 11/079 714/25 |

* cited by examiner

*Primary Examiner* — Philip Guyton
(74) *Attorney, Agent, or Firm* — Buckley, Maschoff & Talwalkar LLC

(57) ABSTRACT

Systems and methods include acquisition of a database system workload comprising a plurality of database queries, replay of the database system workload on each of a plurality of database systems to generate a plurality of failed events, each of the plurality of failed events associated with a plurality of attributes, assignment of a root cause to each of the plurality of failed events, and training of a classification model, based on the plurality of failed events an assigned root causes, to infer an output root cause based on an input plurality of attributes.

20 Claims, 8 Drawing Sheets

| Event ID | Error Code | Error Message | SQL Type | SQL Sub Type | Request Type | Root Cause |
|---|---|---|---|---|---|---|
| 10000021 | 250986 | 'invalid argument: cannot determine volume id' | 1 | 1 | Type1 | RC1 |
| 10000022 | 7000012 | 'Internal error: error=invalid table name" Could not find table' | 7 | 1 | Type2 | RC2 |

Algorithm 1 CustomDistance

1: Input: $x, y \leftarrow Event$
2: $distance \leftarrow 0$
3: for $i \leftarrow 1$ to $len(x)$ do
4:    if $type(x[i]) == \text{'}ErrorMessage\text{'}$ then
5:       $x[i] \leftarrow TextVectorizer(x[i])$
6:       $y[i] \leftarrow TextVectorizer(y[i])$
7:       $distance \leftarrow distance + cosine\_distance(x[i], y[i])$
8:    else
9:       $binary\_comparison \leftarrow 0$
10:       if $x[i] != y[i]$ then
11:          $binary\_comparison \leftarrow 1$
12:       end if
13:       $distance \leftarrow distance + binary\_comparison$
14:    end if
15: end for
16: return $distance/len(x)$

*FIG. 8*

USING WORKLOAD DATA TO TRAIN ERROR CLASSIFICATION MODEL

CROSS-REFERENCE TO RELATED APPLICATIONS

This application claims priority to U.S. Provisional Patent Application No. 63/305,825, filed Feb. 2, 2022, the contents of which are incorporated by reference herein for all purposes.

BACKGROUND

Conventional database systems store large volumes of data related to many aspects of an enterprise. Database systems vendors, partners and customers may from time-to-time desire to upgrade or otherwise change a database system. Possible changes include a software upgrade of the relational database management system (RDBMS), a change to the hardware or operating system (e.g., moving from a single host to a distributed system), and a change to the data schema (e.g., adding or removing indices).

Due to the importance of database systems to an enterprise, such changes are subjected to thorough testing and validation to avoid any unexpected regression—in terms of stability, performance or functionality. Such testing may include executing a workload received by a production database system on a changed (i.e., "test") database system, identifying any errors which occurred during the execution, determining the root causes of the errors, and addressing those root causes.

Unfortunately, many errors which arise during such testing are false positives, which do not represent actual regressions in the test system. False positives may be caused by non-deterministic behavior such as multi-threading and concurrency, sources of randomness, date and time, missing functionality of a workload recording tool, hardware-specific code paths, influence of the recording tool on the observed behavior, missing data, and different configuration settings. External factors may also result in false positives, such as infrastructure issues with the network, hardware, or the storage application. The existence of false positives slows analysis of the errors which arise during testing because they must be identified and distinguished from "true" errors.

Systems are desired for efficiently identifying root causes of errors which arise during database system testing. Such systems may also facilitate the identification of false positive errors.

BRIEF DESCRIPTION OF THE DRAWINGS

FIG. 8 is a custom distance algorithm for use in training a classification model to identify root causes of failed database events according to some embodiments.

DETAILED DESCRIPTION

The following description is provided to enable any person in the art to make and use the described embodiments and sets forth the best mode contemplated for carrying out the described embodiments. Various modifications, however, will remain apparent to those in the art.

Some embodiments generate a classification model for classifying the root cause of a database system error. The training data for training such a classification model is generated, in some embodiments, by replaying production database workloads on a plurality of heterogeneous database systems. A system for capturing production database workloads and replaying those workloads on database systems is described in commonly-assigned U.S. Pat. No. 11,294,897. During the replay, the result of execution (i.e., success/fail) and a set of attributes for each query (typically a Structured Query Language (SQL) statement) are collected. Such a collection is referred to herein as an event, and the training data is generated based on events associated with failed executions (i.e., failed events).

The attributes of a failed event may include related Structured Query Language (SQL) queries, error codes, error messages, stack traces, and information from bug tracker and project management tools. Each failed event is also associated with a root cause (e.g., by a domain expert), which becomes the ground truth associated with the failed event. The attributes of each failed event, and its associated ground truth root cause, comprise the training data used to train the classification model.

According to some embodiments, a first set of root causes which may be output by the trained model is associated with false positives, while the remaining root causes are associated with true errors. Failed events which are classified by the trained model as having one of the first set of root causes may therefore be ignored during system testing and debugging.

Figure 1:
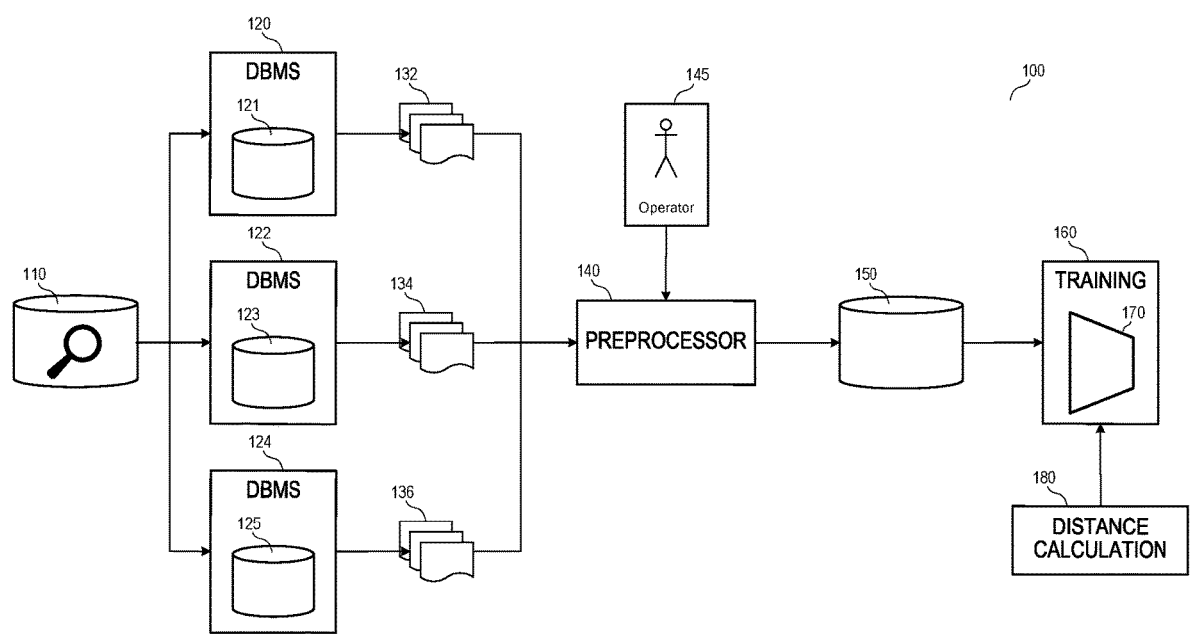
FIG. 1 is a block diagram of a system to train a classification model to identify root causes of failed database events according to some embodiments.

FIG. 1 is a block diagram of architecture 100 to train a classification model to identify root causes of failed database events according to some embodiments. The illustrated components may be implemented using any suitable combination of computing hardware and/or software that is or becomes known. In some embodiments, two or more components are implemented by a single computing device. Two or more components of architecture 100 may be co-located. One or more components may be implemented as a cloud service (e.g., Software-as-a-Service, Platform-as-a-Service). A cloud-based implementation of any components of architecture 100 may apportion computing resources elastically according to demand, need, price, and/or any other metric.

Production workloads 110 may include all requests (e.g., SQL queries) made to a database system during a capture period, along with all concurrency and transactional information. The requests may be received from one or more application servers (not shown) and result from actions by end users (not shown) of the database system. Requests may also be internally-generated by the database system (e.g., for maintenance or management).

Database systems 120, 122 and 124 comprise a database management system and respective data storage systems 121, 123 and 125. Database systems 120, 122 and 124 may comprise any type and implementation of a database system that is or becomes known. For example, one or more of database systems 120, 122 and 124 may comprise an in-memory database system, a cloud-based database system, and online transaction processing (OLTP) database system, etc.

Database systems 120, 122 and 124 may differ from one another. For example, each database management system may comprise a different pre-release version (i.e., different builds of a code line). Database systems 120, 122 and 124 may differ from one another in any number of other manners.

Each of database systems 120, 122 and 124 replays workloads 110. Workloads 110 are replayed against each of database systems 120, 122 and 124 in an order that is consistent with that of the transactional information captured therewith. Workloads 110 may therefore be processed prior to their replay to determine the correct order of transaction execution.

Replay of workloads 110 causes database systems 120, 122 and 124 to generate respective sets 132, 134 and 136 of failed events. Each failed event of a set 132, 134 and 136 represents an error which occurred during replay of workloads 110, and includes attributes associated with the error. As mentioned above, the attributes may include but are not limited to associated SQL queries, error codes, error messages, stack traces, and information from bug tracker and project management tools.

All failed events are transmitted to preprocessor 140. Generally, preprocessor 140 operates to generate training data 150 based on the failed events. Preprocessor 140 may select only a subset of the attributes of each failed event 132, 134, 136 to be included in training data 150. Preprocessor 140 may transform the selected attributes of each failed event to a format suitable for input to a classification model. For example, text attribute values may be converted to numeric values.

Preprocessor 140 also operates to assign a root cause (i.e., a ground truth value) to each failed event. In some embodiments, one or more operators 145 review the attributes of the failed events and provide preprocessor 140 with a respective root cause of each event. Preprocessor 140 associates the root cause of an event with the selected attributes of the event.

Training data 150 therefore consists, for each failed event, of a set of transformed attributes and a root cause. Training component 160 uses training data 150 to train classification model 170 to output a classification (i.e., a root cause) based on a set of attributes of a failed event. Generally, training component 160 trains model 170 to learn a mapping from a set of input attributes to a plurality of possible classifications (i.e., root causes). Training component 160 may utilize any suitable training protocol that is or becomes known.

Model 170 may comprise any type of learning network that is or becomes known, such as a statistical model, a learning algorithm or a neural network. Model 170 may comprise a network of neurons which receive input, change internal state according to that input, and produce output depending on the input and internal state. The output of certain neurons is connected to the input of other neurons to form a directed and weighted graph. The weights as well as the functions that compute the internal state can be modified via training as will be described below.

Model 170 uses an algorithm to learn the patterns (e.g., classification boundaries) present in training data 150. According to some embodiments, this algorithm is a K-Nearest Neighbors (KNN) algorithm. A KNN algorithm relies on a distance metric to identify neighbors or the most similar instances of an instance to be classified. Accordingly, some embodiments provide custom distance calculation 180 which is particularly suited to determining distances between failed event attributes and will be described below.

Figure 2:
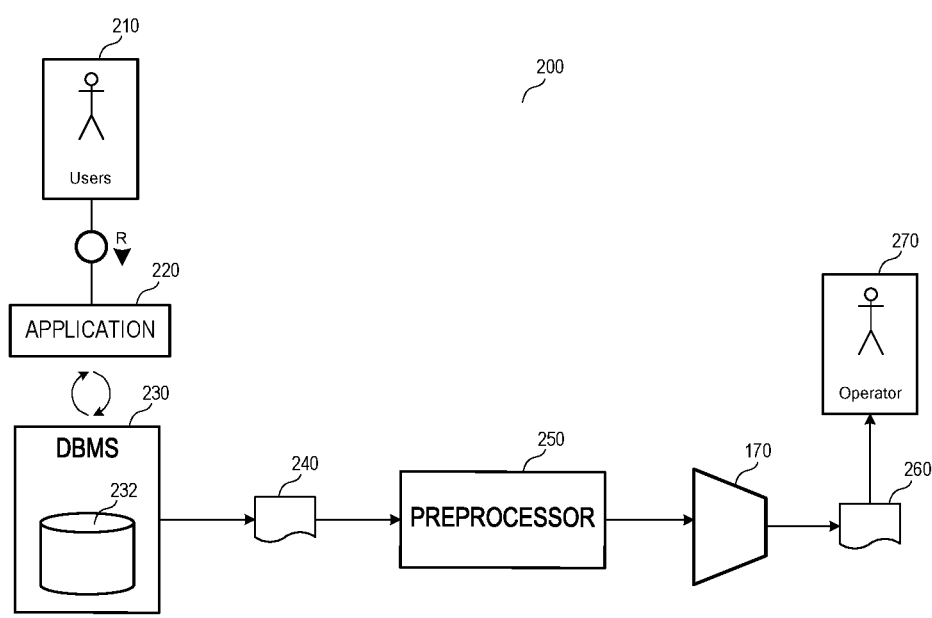
FIG. 2 is a block diagram of a system deploying a trained classification model to identify root causes of failed database events according to some embodiments.

FIG. 2 is a block diagram of system 200 deploying trained classification model 170 to identify root causes of failed database events according to some embodiments. Accordingly, it will be assumed that model 170 of FIG. 2 has been trained as described herein. As is known in the art, trained model 170 may be implemented by a function having a set of attributes as input parameters, and which outputs a probability associated with each of a plurality of possible root causes based on the input parameters.

According to system 200, one or more users 210 access functionality of application 220. Application 220 may comprise a single user, multi-user and/or multi-tenant application of any type that is or becomes known. In one example, application 220 is a cloud-based server application which authenticates and authorizes users 210 and provides authenticated users with access to certain functionality and data based on their respective authorizations. Such functionality includes access to and processing of data maintained by database system 230 in storage 232. Database system 230 may be different from or identical to any of database systems 120, 122 and 124 used to generate training data for model 170.

During operation, application 220 issues queries against database system 230 based on input received from users 210. Database system 230 operates to serve these queries and return corresponding result sets to application 220. Service of the queries may result in one or more errors. Such an error may be described within the attributes of failed event 240 as described above.

The attributes of failed event 240 are preprocessed by preprocessor 250 as described above with respect to preprocessor 140. For example, preprocessor 250 may select a same subset of the attributes as selected by preprocessor 140 and may perform the same transformations on the selected attributes. Preprocessor 250 does not assign a root cause to the subset of transformed attributes. Rather, the subset of transformed attributes is input to model 170, which operates as trained to output classification (i.e., root cause) 260. Model 170 may output a respective probability for each of a plurality of candidate root causes, and the candidate root cause associated with the highest probability may be identified as output root cause 260.

Root cause 260 may assist the debugging of database system 230 to prevent future failed events such as event 240. If root cause 260 is associated with false positives, then it may be determined that no such debugging is needed in view of failed event 240.

According to some embodiments, operator 270 reviews and confirms that root cause 260 is properly inferred based on failed event 240. Such review may be performed periodically to validate performance of model 170, in cases where root cause 260 is associated with a relatively low probability or a relatively low confidence. In any case, the operator-confirmed root cause and associated failed event 240 may be added to training data 150 to influence future re-training of model 170. In this regard, model 170 may be periodically retrained based on failed events resulting from replays of new workloads 110.

Figure 3:
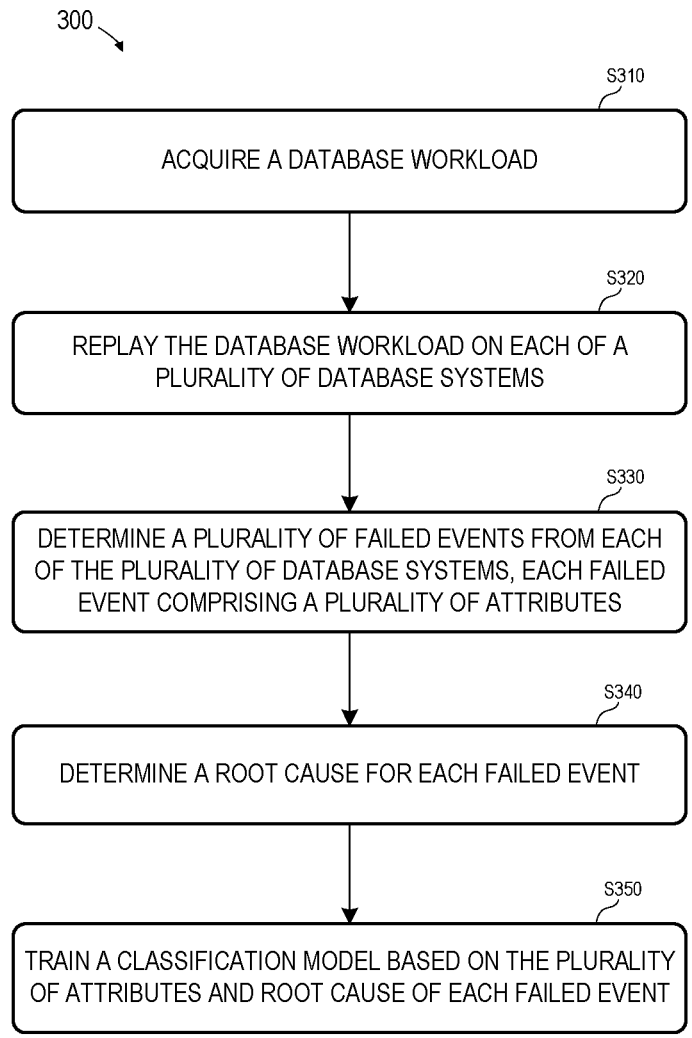
FIG. 3 is a flow diagram of a process to train a classification model to identify root causes of failed database events according to some embodiments.

FIG. 3 is a flow diagram of process 300 according to some embodiments. Process 300 and the other processes described herein may be performed using any suitable combination of hardware and software. Software program code embodying these processes may be stored by any non-transitory tangible medium, including a fixed disk, a volatile or non-volatile random access memory, a Flash drive, or a magnetic tape, and executed by any one or more processing units, including but not limited to a microprocessor, a microprocessor core, and a microprocessor thread. Embodiments are not limited to the examples described below.

Figure 4:
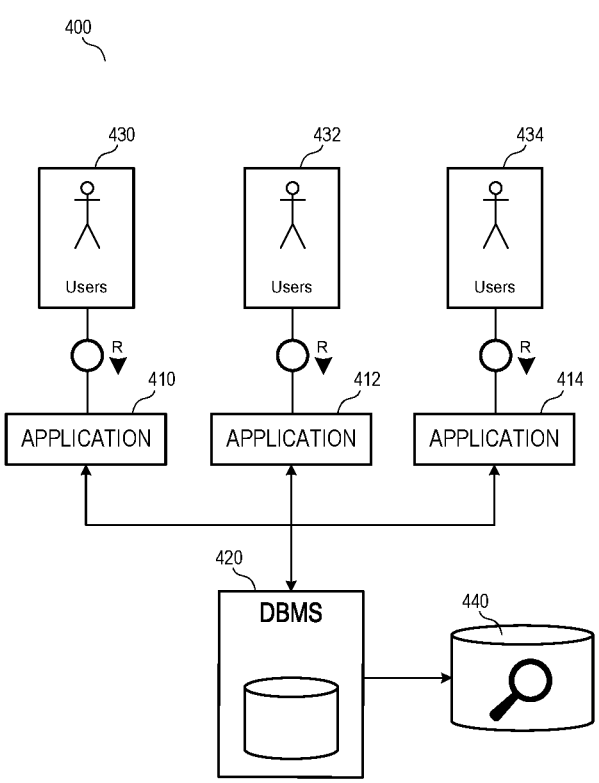
FIG. 4 is a block diagram of a system to collect a database workload according to some embodiments.

Initially, at S310, a database workload is acquired. The database workloads may include all requests (e.g., SQL queries) made to a production database system and all concurrency and transactional information during a capture period. FIG. 4 illustrates one non-exhaustive example of system 400 to acquire a database workload according to some embodiments. Each of applications 410, 412 and 414 issues requests to database system 420 during a capture period based on input received from users 430, 432 and 434, respectively. Two or more of applications 410, 412 and 414 may comprise instances of a same application or of different applications. Database system 420 is configured to save the requests to workload data storage 440, and the requests may be acquired therefrom at S310. According to some embodiments, a gateway or routing component receives the requests prior to reception by database system 420, and routes the requests to database system 420 for execution and to data storage 440 for storage.

The acquired workload is replayed on each of a plurality of database systems at S320. The plurality of database systems may differ from one another in any number of other manners. Replay of the workload causes each of the plurality of database systems to generate a plurality of failed events, which are determined at S330. Each failed event represents an error which occurred during replay of the workload, and includes attributes associated with the error.

As mentioned above, the attributes may include but are not limited to associated SQL queries, error codes, error messages, stack traces, and information from bug tracker and project management tools. S330 may comprise selecting a subset of the attributes to be used within training data. For example, in some embodiments, the selected attributes include Error Code, Error Message, Request Type, SQL Type and SQL Sub Type. These attributes may be selected based on domain knowledge suggesting that these attributes are the most predictive of the root cause of an error.

A root cause is determined for and assigned to each failed event at S340. In some embodiments, one or more domain experts review the failed events and provide a respective root cause of each event. The review may consider the selected subset of attributes as well as any other attributes deemed useful by the domain experts.

Figures 5, 6:
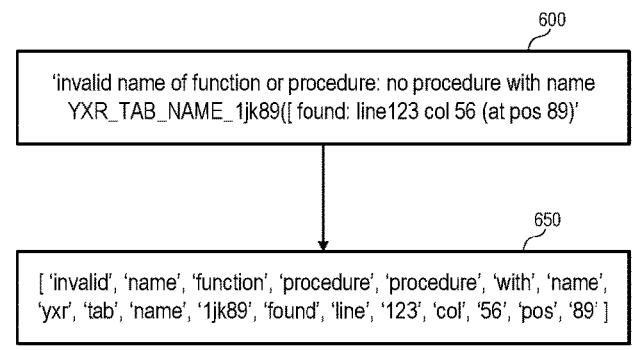
FIG. 5 is a tabular representation of event attributes according to some embodiments.
FIG. 6 illustrates pre-processing of event attributes to generate training data according to some embodiments.

FIG. 5 illustrates table 500 including data representing two failed events, which includes values for the above-listed attributes for each event as well as an associated root cause (e.g., RC1, RC2) determined for each event at S340. The Error Code and Error Message attributes are collected for every failed event from the SQL interface which is exposed to clients interacting with the database. The attribute SQL Type indicates whether the statement is a DDL, DML, etc., and the attribute SQL Sub Type indicates finer granularity of the SQL type.

Some tables may be unavailable during the replay due to limitations of the recording tool or database configuration differences. For example, a test database might not include external database plugins of the production database. In another example, randomly generation of table names during the replay may cause a successor "SELECT" SQL to no longer find these tables. Attempts to access unavailable tables may fail with Error Messages such as "Could not find table/view X". These failed events may be regarded as false positives. These events may therefore be grouped under a single root cause that represents errors caused by privacy issues rather than by bugs, etc. As a result, many types of failures can be aggregated under only a few root causes.

A classification model is trained at S350 based on the plurality of attributes and root cause determined for each failed event (e.g., based on each row of table 500). As mentioned above, the classification model is trained to learn a mapping from the selected set of attributes to a plurality of possible root causes. As also mentioned, the attributes of the failed events may be pre-processed prior to their use as training data.

Such preprocessing may address class imbalances in the training data. For example, since some failures may occur more frequently than others, there may be more training data samples (i.e., rows) associated with certain root causes than with other root causes. Some embodiments therefore downsample the larger classes. Rather than randomly downsample, which is not suitable because a single root cause might consist of multiple errors that vary slightly in pattern and all the patterns in the data should be represented, all known error patterns within a class (i.e., training data associated with a single root cause) are collected and enough samples are selected from each pattern to retain an effective representation of the patterns within the data. Downsampling may also eliminate a substantial number of unimportant terms from the vocabulary of the resulting Doc2Vec and TFIDF vectorization models, which are referenced below.

With respect to the FIG. 5 example, all the selected attributes but for Error Message are categorical. The categorical data is converted into numerical data during preprocessing. In some embodiments, the categorical data is discretized or otherwise grouped to reduce the number of unique values per categorical attribute and thus the number of resulting dimensions. The encoded categorical attributes of a failed event are concatenated along with the vectorized error message of the event in order to generate an instance of input-ready training data.

The values of the Error Message attribute are unstructured and have different lengths. The knowledge of domain experts may be used to ascertain the contributions of error message patterns towards identification of the root causes. For example, error messages generally contain discriminating information such as the location of the error in terms of line numbers and positions. Some errors may come from the same file but have different root causes. Accordingly, preprocessing may attempt to retaining numbers present in the error messages in order to exploit this information.

However, not all numbers are equally useful. For instance, error messages may contain temporary table names including numbers, alphabets and nonalphanumeric characters. Such temporary names are unique in each error message and are not useful for identifying root causes. Therefore, such strings are discarded during preprocessing the error messages. Preprocessing of error messages may also include lower casing, removal of nonalphanumeric characters, and removal of stopwords.

FIG. 6 is an example of error message 600 before preprocessing and error message 650 after preprocessing of error message 600. It will be assumed that five different classes share this error message pattern. Among these classes, differences in the error message appear only with respect to the name of the table on which the error occurs and the location of the error. The numbers appearing after terms such as 'line', 'pos' may also have been shown to be indicative of root cause. Retaining the context of terms through word order may be beneficial in such cases. A Bag of Words model like TFIDF ignores the word order and therefore will fail to capture such dependencies. Creating n-grams may assist in retaining the word order but results in high dimensional data.

Some embodiments therefore utilize Doc2Vec to create embeddings for the error messages. Each error message is tagged with the class label while training the embedding model to establish an additional context of patterns belonging to the same root cause. Terms such as '1jk89' may repeat only in rare cases and may be mostly eliminated by setting a suitable minimum term frequency (e.g., 3) during vectorization.

Figure 7:
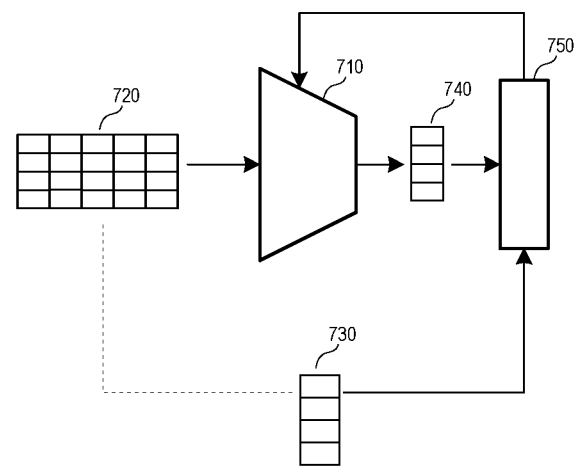
FIG. 7 is a block diagram of a system to train a classification model according to some embodiments.

Returning to the training at S350, FIG. 7 is a block diagram of iterative training of classification model 710 according to some embodiments of S350. Model 710 may comprise any suitable classification model. Model 710 is trained using training data 720 consisting of several rows. Each row of data 720 represents a failed event and includes values of the selected attributes for the failed event. Ground truth data 730 includes the root cause assigned to each row.

Training at S350 may comprise execution of training iterations. One iteration according to some embodiments may include inputting data 720 to model 710, operating model 710 to output resulting inferred root causes 740 for each record of data 720, operating loss layer 750 to evaluate a loss function based on output root causes 740 and known ground truth data 730, and modifying model 710 based on the evaluation. Iterations continue until model performance is satisfactory. Determination of model performance may include determination of any one or more metrics of model accuracy, precision, etc. that are or become known.

The KNN algorithm may be used as the classification model. KNN relies on a distance metric to identify neighbors of or the most similar instances to an instance to be classified. To address the problem of encoding the event data while avoiding high dimensions, some embodiments utilize a custom distance function which calculates a total distance between two failed events by adding up the distances between the individual attributes (i.e., categorical and Error Message) of the events. FIG. 8 illustrates one example of such a custom distance function.

The custom distance function may provide different weights to different attributes. The weight of an attribute is multiplied by the distance between the compared two values of attribute to determine the weighted distance between the two values. For instance, Error Code and Error Message may be associated with higher weights than other attributes as they may be the most effective attributes for identifying root cause for a failure. In some embodiments, Error Message is associated with a weight of 4, Error Code is associated with a weight of 2 and all other attributes are associated with a weight of 1.

Figure 9:
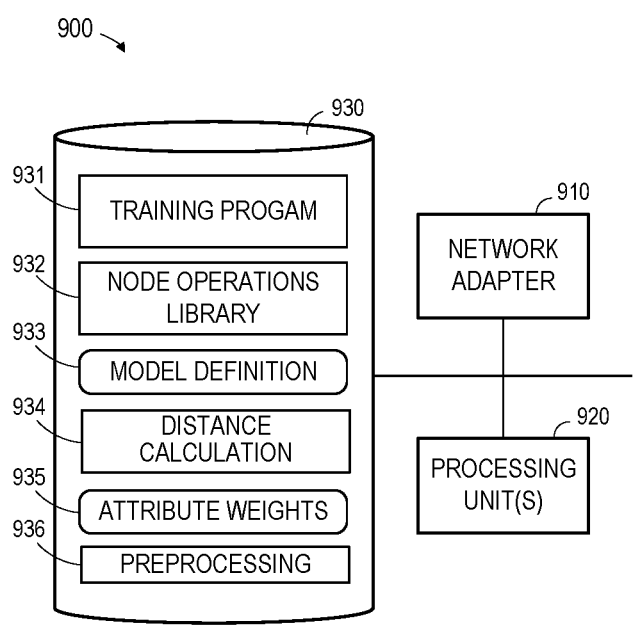
FIG. 9 is a block diagram of a computing device according to some embodiments.

FIG. 9 illustrates computing system 900 according to some embodiments. System 900 may comprise a computing system to facilitate the design and training of a classification model as is known in the art. Computing system 900 may comprise a standalone system, or one or more elements of computing system 900 may be located in the cloud.

System 900 includes network adapter 910 to communicate with external devices via a network connection. Processing unit(s) 920 may comprise one or more processors, processor cores, or other processing units to execute processor-executable program code. In this regard, storage system 930, which may comprise one or more memory devices (e.g., a hard disk drive, a solid-state drive), stores processor-executable program code of training program 931 which may be executed by processing unit(s) 920 to train a model as described herein.

Training program 931 may utilize node operations library 932, which includes program code to execute various operations associated with node operations as defined in node operations library 932. The structure and nodes of a classification model may be defined in model definition 933. According to some embodiments, computing system 900 provides interfaces and development software (not shown) to enable generation of model definition 933.

Training program 931 may use distance calculation 934 and associated attribute weights 935 during training of a model as described herein. Preprocessing component 936 may be executed to preprocess event attribute data to generate training data as described herein. System 900 may output a trained classification which may be used to infer root causes based on preprocessed event attribute data as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
   a storage device storing a database system workload, the database system workload comprising a plurality of database queries;
   a first database system to replay the database system workload to generate a first plurality of failed events, each of the first plurality of failed events including a plurality of attributes;
   a second database system to replay the database system workload to generate a second plurality of failed events, each of the second plurality of failed events including the plurality of attributes; and
   a model training system to:
     assign a root cause to each of the first plurality of failed events and the second plurality of failed events; and
     train a classification model based on a distance calculation, the plurality of attributes of the first plurality of failed events, the plurality of attributes of the second plurality of failed events and the assigned root causes to infer an output root cause based on input values of the plurality of attributes, wherein the distance calculation is to calculate a distance between a first failed event and a second failed event based on distances between respective attributes of the first failed event and the second failed event.

2. A system according to claim 1, wherein the classification model is trained based on a first subset of the plurality of attributes of the first plurality of failed events and the first subset of the plurality of attributes of the second plurality of failed events.

3. A system according to claim 2, wherein the first subset includes categorical attributes and an error message attribute, the training system further to:
encode the categorical attributes to numerical values and vectorize the error message attribute.

4. A system according to claim 3, wherein the error message attribute is vectorized using Doc2Vec vectorization.

5. A system according to claim 1, wherein the classification model is trained using a K-Nearest Neighbors algorithm.

6. A system according to claim 1, wherein the distance calculation calculates a first distance between a first attribute of the first failed event and the first attribute of the second failed event based on a first weighting, and calculates a second distance between a second attribute of the first failed event and the second attribute of the second failed event based on a second weighting.

7. A method comprising:
acquiring a database system workload comprising a plurality of database queries;
replaying the database system workload on each of a plurality of database systems to generate a plurality of failed events, each of the plurality of failed events associated with a plurality of attributes;
assigning a root cause to each of the plurality of failed events; and
training a classification model, based on a distance calculation, the plurality of failed events an assigned root causes, to infer an output root cause based on an input plurality of attributes,
wherein the distance calculation is to calculate a distance between a first failed event and a second failed event based on distances between respective attributes of the first failed event and the second failed event.

8. A method according to claim 7, further comprising:
receiving a first failed event associated with the plurality of attributes; and
inputting the first failed event to the trained classification model to generate a first root cause.

9. A method according to claim 7, wherein the classification model is trained based on a subset of the plurality of attributes of the plurality of failed events.

10. A method according to claim 9, wherein the subset includes categorical attributes and an error message attribute, the method further comprising:
encoding the categorical attributes to numerical values and vectorizing the error message attribute.

11. A method according to claim 10, wherein the error message attribute is vectorized using Doc2Vec vectorization.

12. A method according to claim 7, wherein the classification model is trained using a K-Nearest Neighbors algorithm.

13. A method according to claim 7, wherein the distance calculation calculates a first distance between a first attribute of the first failed event and the first attribute of the second failed event based on a first weighting, and calculates a second distance between a second attribute of the first failed event and the second attribute of the second failed event based on a second weighting.

14. A non-transitory computer-readable medium storing program code executable by a processing unit of a computing device to:
acquire a database system workload comprising a plurality of database queries;
replay the database system workload on each of a plurality of database systems to generate a plurality of failed events, each of the plurality of failed events associated with a plurality of attributes;
assign a root cause to each of the plurality of failed events; and
train a classification model, based on a distance calculation, the plurality of failed events an assigned root causes, to infer an output root cause based on an input plurality of attributes,
wherein the distance calculation is to calculate a distance between a first failed event and a second failed event based on distances between respective attributes of the first failed event and the second failed event.

15. A medium according to claim 14, the program code executable by a processing unit of a computing device to:
receiving a first failed event associated with the plurality of attributes; and
inputting the first failed event to the trained classification model to generate a first root cause.

16. A medium according to claim 14, wherein the classification model is trained based on a subset of the plurality of attributes of the plurality of failed events.

17. A medium according to claim 16, wherein the subset includes categorical attributes and an error message attribute, the program code executable by a processing unit of a computing device to:
encode the categorical attributes to numerical values and vectorize the error message attribute.

18. A medium according to claim 17, wherein the error message attribute is vectorized using Doc2Vec vectorization.

19. A medium according to claim 14, wherein the classification model is trained using a K-Nearest Neighbors algorithm.

20. A medium according to claim 14, wherein the distance calculation calculates a first distance between a first attribute of the first failed event and the first attribute of the second failed event based on a first weighting, and calculates a second distance between a second attribute of the first failed event and the second attribute of the second failed event based on a second weighting.

* * * * *